No. 817,815. PATENTED APR. 17, 1906.
R. H. STEARNS & H. KLEHM.
SHIFTER.
APPLICATION FILED MAR. 27, 1905.

WITNESSES:
F. A. Otto
N. Steinhart

INVENTORS:
Roswell H. Stearns
Henry Klehm
BY
Erwin E. Wheeler
ATTORNEYS.

UNITED STATES PATENT OFFICE.

ROSWELL H. STEARNS AND HENRY KLEHM, OF MILWAUKEE, WISCONSIN.

SHIFTER.

No. 817,815.	Specification of Letters Patent.	Patented April 17, 1906.

Application filed March 27, 1905. Serial No. 252,191.

*To all whom it may concern:*

Be it known that we, ROSWELL H. STEARNS and HENRY KLEHM, citizens of the United States, residing at Milwaukee, county of Milwaukee, and State of Wisconsin, have invented new and useful Improvements in Shifters, of which the following is a specification.

Our invention relates to improvements in shifters, with especial reference to that class of devices used for shifting belts.

The object of our invention is to provide simple and inexpensive mechanism for transmitting successive movements in one direction of a pivotally-oscillating member to actuate another member alternately in opposite directions in a straight line and without motion-transmission during the retractive movements of the oscillating member.

In the following description reference is had to the accompanying drawings, in which—

Figure 1:
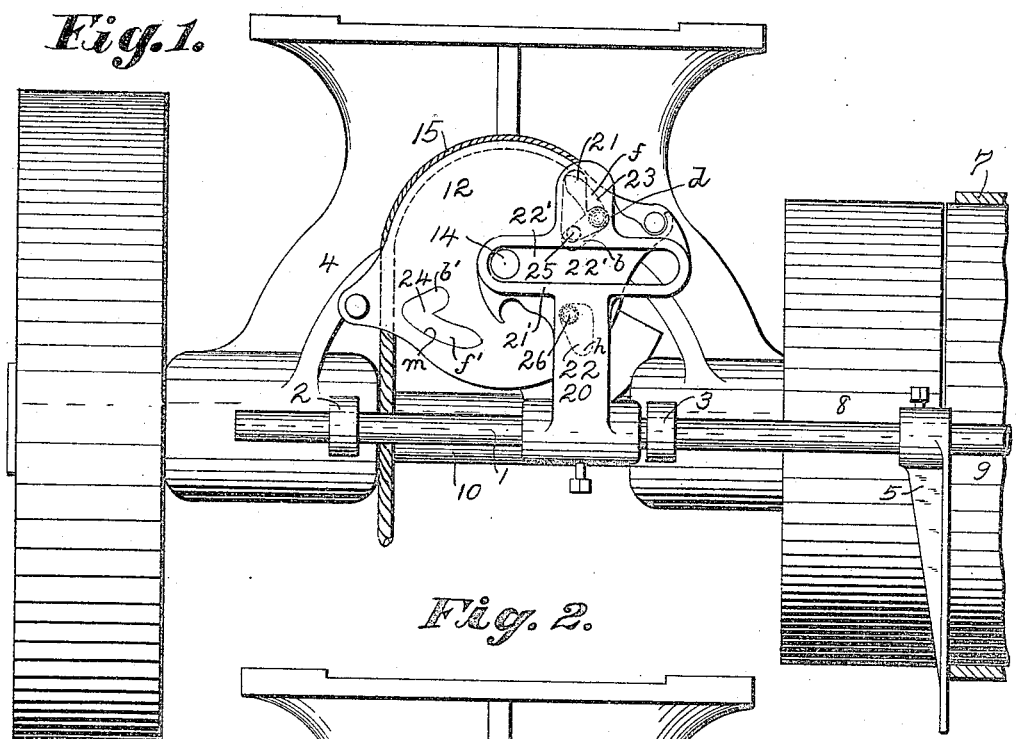
Figure 2:
Figure 3:
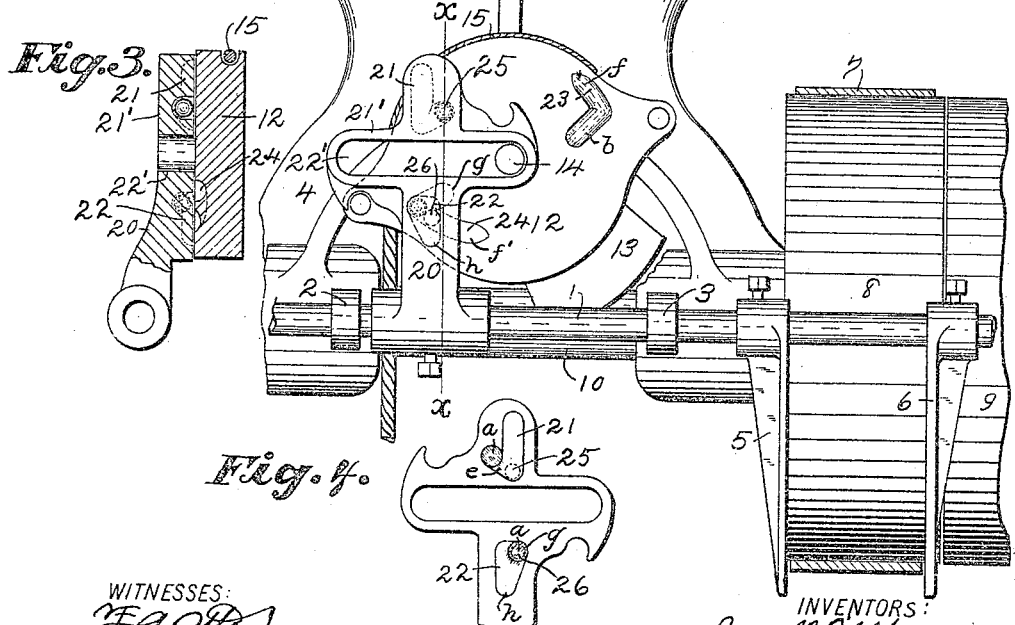
Figure 4:
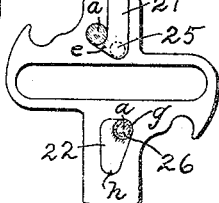

Figure 1 is an elevation showing the invention embodied in a belt-shifter and in position with the belt engaging the loose pulley on a counter-shaft. Fig. 2 is an elevation of the invention, showing the belt on the fixed pulley of the counter-shaft. Fig. 3 is a sectional view drawn on line *x x* of Fig. 2. Fig. 4 is a detail view showing the inner face of the yoke on the belt-shifting-bar.

Like parts are identified by the same reference characters throughout the several views.

The shifter-bar 1 is mounted to slide in suitable bearings at 2 and 3 in a yoke 4 and is provided with belt-engaging arms 5 and 6 in operative relation to a belt 7, operating upon fast and loose pulleys 8 and 9 on the counter-shaft 10. An actuating device comprising a plate 12, having a weight 13 mounted thereon, is pivoted at 14 to the yoke 4 and provided with a segmental groove for an operating-rope 15, which is secured to the plate in such a manner that a pull upon the rope will operate to lift the weight. The weight serves to restore the plate to normal position when the rope is released.

The shifter-bar 1 is provided with an arm 20, having a cross-head 21, slotted at 22 for the projecting end of the pivot-shaft 14, on which the plate 12 is mounted. The arm 20 extends vertically across the face of the plate and is provided with upper and lower recesses 21 and 22, which are adapted to be brought into registry with recesses 23 and 24, respectively, in the plate 12, and loose balls 25 and 26, operative in said upper and lower recesses, are adapted to serve as clutch members to connect the plate and arm for movement in one direction. The upper recess 23 in the plate is formed to release the ball in one direction, and the lower recess 24 in the plate is formed to release the ball in the other direction. The recesses 21 and 22 in the arm 20 are each provided with a socket *a* of such depth that when the ball is therein, it will not project beyond the face of the arm 20 and will therefore not engage the plate 12. This socket is, however, located above the lower end of the recess in each case, so that when the ball registers with a recess in the plate 12 it drops by gravity out of the socket *a* and takes a position in the lower portion of the recess, where it projects into the registering recess in the plate and connects the arm and plate for motion-transmission.

The peculiar form of the recesses will be best understood from a description of the operation. When the parts are in the position in which they are shown in Fig. 1, the ball 25 in the upper recess 21 of the arm 20 drops from its socket into the lower portion of the recess and projects therefrom into the lower portion of the recess 23 in the plate. With the parts in this position a pull upon the rope will cause the upper portion of the plate to swing to the left, taking the ball 25 and arm 20 with it, and thus shifting the bar 1 and belt. Owing to the fact that the recessed portion of the plate travels in a circular path, while the arm 20 moves in a straight horizontal line, it is necessary to provide for a radial movement of the ball, and the recesses are therefore elongated so that the ball may travel outwardly in recess 21 as it approaches the vertical center line of the plate and then inwardly after passing that line. The ball is also permitted to move radially inwardly in the arm *b* of the recess 22 of the plate 12 as it approaches the vertical center line and outwardly after passing that line, the relative movement of the ball in recess 23 being opposite that in the recess 21. When the plate comes to rest, (with the weight raised,) the ball again occupies a position at the base of recess 21 and at the angle *d* of the recess 23, and when the rope is released the weight returns the plate to normal position. The plate, during its initial return movement, pushes the ball into the arm e of the recess 21 and into the socket a, the arm f of the recess 23 being shallow tapered for this purpose and the arm e having a counterpart taper, so that the ball will be rolled into the socket and the plate released.

When the plate 12 reaches normal position, (the arm 20 remaining in its left-hand position, as shown in Fig. 2,) the recess 24 of the plate is brought into registry with the recess 22, and the ball 26 in that recess drops out of the socket in the upper corner to the lower end $h$ of the recess, where it projects into the recess 24 in position to push the arm 20 to the right during the next downward pull on the rope. The form of the recesses 22 and 24 is somewhat different from that of the upper recesses 21 and 23, owing to the fact that the lower portion of the disk swings downwardly, while the upper portion swings upwardly toward the vertical center line, while the ball tends to drop by gravity to the lowest point in both cases. The recess 24 is, however, provided with a radial arm $b'$, corresponding with that marked $b$ in recess 21, and also with a shallow tapered arm $f'$, corresponding with the similar arm $f$ in the recess 21, but having a spiral trend toward the axis of oscillation, whereby the ball will be lifted to the socket $a$ at the upper corner $g$ of the recess and pushed into the socket during the initial return movement of the plate 12. When passing the vertical center line, the ball 26 is lifted to the corner $h$ of the recess 22, the recess being wide enough to permit this lifting of the ball without restoring it to the socket $a$ and the ball being held to the opposite side of the recess from that occupied by the socket by the pressure of the plate as it pushes the arm 20. During the return movement of the plate the ball 26 is lifted on the inwardly-curved lower edge $m$ of the tapered recess-arm $f'$ and pushed into the socket $a$, thus permitting the arm 20 and shifter-bar 1 to remain in the right-hand position, as in Fig. 1, pending the next pull upon the rope, while the plate returns to normal position and brings recesses 21 and 23 again into registry and allows ball 25 to drop from its socket into operative position. It will thus be seen that the balls 25 and 26 act in alternation during successive pulls on the rope, and each remains in its socket $a$ pending the operation of the other. The shifter-bar is therefore moved alternately in opposite directions by successive pulls upon the operating-rope.

Having thus described our invention, what we claim as new, and desire to secure by Letters Patent, is—

1. In a shifter, the combination of an oscillating member; a reciprocating member; and a clutch member adapted to temporarily connect the other two members for motion-transmission during alternate swinging movements of the oscillatory member in one direction; together with means for returning said reciprocating member in the intervals between the operations of the clutch member.

2. In a shifter, the combination of an oscillating member; a reciprocating member; and a clutch member adapted to connect said members for motion-transmission at points traveling on divergent lines; said members being formed to permit a compensating movement of the clutch member substantially equal to the divergence in movement between the two first-mentioned members, at the place of connection.

3. In a shifter, the combination of an oscillating member and a reciprocating member, having opposing recessed faces; and a loose ball located in the recesses of said faces and having a greater diameter than the depth of either recess except at one point where one recess is provided with a socket of greater depth than the diameter of the ball; the other recess being formed with walls adapted to push the ball into said socket when the members are in relative movement in one direction, and said recesses being also formed to permit the ball to drop by gravity out of said socket when the recesses are again brought into registry.

4. In a shifter, the combination of an oscillating member and a reciprocating member, having opposing recessed faces; and a loose ball located in the recesses of said faces and having a greater diameter than the depth of either recess except at one point where one recess is provided with a socket of greater depth than the diameter of the ball; the other recess being formed with walls adapted to push the ball into said socket when the members are in relative movement in one direction, and said recesses being also formed to permit the ball to drop by gravity out of said socket when the recesses are again brought into registry, said recesses being elongated to permit a compensatory movement of the ball during the swinging movement of the oscillatory member at the time of ball engagement.

5. In a shifter, the combination of two relatively movable members; a loose ball engaged in suitable recess in one of the members, and arranged to project into a recess in the other member in one position of adjustment; and means for pushing said ball out of the recess in one of the members when said member is moved in one direction.

6. In a shifter, the combination of an oscillating member, recessed on opposite sides of its pivotal center; another member provided with loose balls mounted in sockets therein, and having recesses leading to said sockets; said balls being adapted to drop from said sockets into said recesses when in registery with the recesses of the other member, and each of said recesses being of less depth than the diameter of the ball, said oscillating member having the walls of each of its recesses formed to crowd the corresponding ball out of such recess into the socket of the other member during the return movement of the oscillating member and the recesses of said oscillating member being formed to register alternately with those of the other member.

7. In a shifter, an oscillatory member; clutch members in operative relation thereto; and a motion-receiving member; one of said clutch members being arranged to act upon the motion-receiving member during alternate strokes of the oscillatory member in the same direction, and the other clutch member being arranged to act upon the motion-receiving member during the intermediate strokes of the oscillatory member in the same direction.

8. In a shifter, an oscillating actuating member having recesses on opposite sides of the pivot of oscillation and extended with gradually-increasing depth in one direction along the face of said member; an actuated member; and clutch members adapted to alternately engage in the respective recesses; the extended portions of said recesses being adapted to release the clutch members when the actuating member is moved in one direction.

9. In a shifter, the combination of a shifting bar mounted for longitudinal movement in supporting-bearings; an oscillatory member pivotally mounted on a suitable support in proximity thereto; means for actuating the oscillatory member to normal position; a member connected with the shifting bar and provided with a guideway substantially parallel with the bar; a guide, loosely engaged in said guideway; and devices for connecting said members alternately above and below the axis of pivotal oscillation during successive movements of the oscillatory member in one direction.

10. In a shifter, the combination of a shifting bar mounted to reciprocate longitudinally; an oscillatory member pivotally supported adjacent to the bar; a motion-receiving member, connected with the bar and arranged to reciprocate across the axis of pivotal oscillation; and devices for connecting said members alternately above and below the axis of pivotal oscillation; each of said devices being adapted to automatically release said members from motion-transmitting connection during the initial movement of the oscillatory member in one direction.

11. In a shifter, the combination of two movable members in approximate side contact; a pivotal support for one member; a support for the other member adapted to permit a lineal movement; loose balls adapted to alternately engage in registering recesses of the members to connect the same; one of said members being formed with guiding-faces adapted to push the balls out of the recesses in such member during its movement in one direction.

12. In a shifter, an oscillatory member; clutch members in operative relation thereto; and a motion-receiving member, one of said clutch members being arranged to act upon the motion-receiving member during alternate strokes of the oscillatory member in the same direction, and the other clutch member being arranged to act upon the motion-receiving member in an opposite direction during the intermediate strokes of the oscillatory member in the same direction.

13. In a shifter, the combination of an oscillatory member having a side face provided with recesses on opposite sides of the axis of oscillation; each of said recesses being provided with a radially-extending arm, and a shallow tapered arm extending at an angle thereto; together with another member having recessed channels and sockets at one side of the main axis of the channel; and balls mounted in said channels for motion-transmission, substantially as described.

14. In a shifter, a motion-transmitting member provided with an elongated recess and having a socket in one portion of such recess, but at one side of the axis of its elongation, for the reception of a ball-clutch; a loose ball adapted to be partially received therein and wholly received in said socket; and a motion-receiving member adapted to be engaged by the ball when the transmitting member is moved in one direction, and formed to guide the ball into said socket when said transmitting member is moved in the other direction.

In testimony whereof we affix our signatures in the presence of two witnesses.

ROSWELL H. STEARNS.
HENRY KLEHM.

Witnesses:
MYRON DINGS,
THOS. A. HANSON.